United States Patent [19]

Stefansson et al.

[11] Patent Number: 5,407,122
[45] Date of Patent: Apr. 18, 1995

[54] METHOD AND DEVICE FOR FASTENING A SEALING RING ON A PIPE

[75] Inventors: Lars Stefansson, Torekov; Lars Bergman, Hjärnarp, both of Sweden

[73] Assignee: Lindab Aktiebolag, Bastad, Sweden

[21] Appl. No.: 173,759

[22] Filed: Dec. 27, 1993

[30] Foreign Application Priority Data

Dec. 28, 1992 [SE] Sweden .................................. 9203910

[51] Int. Cl.6 ........................ B23K 11/11; B23K 11/36
[52] U.S. Cl. ..................................... 228/212; 228/182;
29/235; 29/237; 29/282; 29/418; 29/452;
219/86.9; 219/91.2
[58] Field of Search ...................... 228/176, 182, 212;
29/890.14, 235, 237, 282, 418, 450, 451, 452;
285/108, 379, 910; 219/86.1, 86.9, 87, 91.2

[56] References Cited

U.S. PATENT DOCUMENTS

| 3,400,954 | 9/1968 | Brown | 285/110 |
|---|---|---|---|
| 3,921,661 | 11/1975 | Emberson | 285/2 |
| 3,955,834 | 5/1976 | Ahlrot | 285/110 |
| 4,050,703 | 9/1977 | Tuvesson et al. | 277/207 A |
| 4,960,968 | 10/1990 | Kusakabe et al. | 219/78.01 |

Primary Examiner—Samuel M. Heinrich
Attorney, Agent, or Firm—Weingarten, Schurgin, Gagnebin & Hayes

[57] ABSTRACT

A method for fastening an elastic sealing ring on a pipe includes the steps of applying a base portion of the sealing ring against the circumferential surface of the pipe, and placing a clamping strap under tension around the outer face of the base portion. The clamping strap is secured to the pipe by spot-welding in at least two welding spots, the spot-welding operation being carried out with the material of the sealing ring located between the clamping strap and the pipe. A device for fastening the sealing ring on the pipe is provided which comprises, in addition to the clamping-strap supply, a movable assembly for feeding the clamping strap to the pipe; an assembly for applying the strap on the base portion of the sealing ring; a unit for spot-welding the clamping strap to the pipe; and a friction-exerting mechanism for gripping and exerting a braking action on the clamping strap.

8 Claims, 2 Drawing Sheets

METHOD AND DEVICE FOR FASTENING A SEALING RING ON A PIPE

FIELD OF THE INVENTION

The present invention is directed to a method for fastening an elastic, circumferential joint-sealing element on the outer side of a tubular body, and more specifically to a method according to the preamble of the independent method claim.

The invention also relates to a device for fastening such a joint-sealing element according to the preamble of the independent device claim.

DESCRIPTION OF THE PRIOR ART

One approach sometimes advocated in the art for achieving a seal between two pipes, one of which is to be inserted in the other, is to fix an elastic sealing ring, usually of rubber, on the outside of the end portion of the smaller pipe.

The present invention is an improvement of the technique disclosed in U.S. Pat. No. 4,050,703, hereby incorporated by reference, in which a sealing ring of U-shaped cross-section is anchored in a circumferential groove in a pipe. In practice, the sealing ring is first applied in the groove with its web closest to the groove bottom, and then a number of holes are punched in the web. A clamping strap, taken from a reel or a supply, is then fed to the pipe, and the end of the strap is spot-welded to the outer side of the pipe at one of the locations of the punched holes in the web. The pipe is then rotated one turn so as to place the clamping strap on the outside of the sealing ring round its entire circumference. The clamping strap is then severed from the reel at a distance from the pipe corresponding to about ¼ of the circumference of the pipe, whereupon the pipe is rotated another quarter of a turn and the other end of the clamping strap is fixed to the pipe by spot welding through the underlying clamping-strap portion and an underlying punched hole in the web of the sealing ring.

Although this solution is quite excellent in terms of sealing efficiency, there are certain drawbacks in respect of manufacturing technique. In fact, punching involves problems, in that it is difficult to set the punching tool with sufficient accuracy. An excessive punching force causes damage to the underlying pipe whereas too small a punching force does not remove the punched rubber material from the sealing ring. Moreover, a special device is required for stretching the clamping strap, a stretcher finger, since the strap is severed from the supply before it has been definitely fastened. Otherwise, the clamping strap would risk not to be sufficiently tightly clamped against the U-web of the seal. However, the stretcher finger also causes adjusting problems, in that the sealing strip runs the risk, when insufficiently clamped by the strap, of loosening from the pipe, whereas in the case of an excessive clamping force the stretcher finger tends to extend the sealing ring, thereby giving rise to an uneven sealing effect.

Adjusting problems are also encountered when changing pipe dimensions, namely when it comes to aligning the free, severed end of the clamping strap with a hole in the web of the sealing ring.

There is thus a need for a method which is simpler and quicker, yet equally reliable as compared with the technique discussed above, for anchoring a sealing ring on a pipe, as well as for a simple and reliable device for carrying out this method.

SUMMARY OF THE INVENTION

One object of the present invention therefore is to overcome the above-mentioned shortcomings and provide a method for fastening an elastic sealing ring on a pipe without any significant risk of the sealing ring loosening, once mounted.

Another object of the invention is to provide a method which comprises as few and as simple operations as possible to allow short cycle times.

Yet another object of the invention is to provide a simple and reliable device for carrying out the method that offers high total operational availability, i.e. high efficiency.

The objects outlined above have now been achieved by a method comprising the characterising steps recited in the independent method claim.

The objects are also achieved by means of a device having the characterising features recited in the independent device claim.

Further, the objects of the invention are achieved by means of a pipe as recited in the independent product claim.

Other features of the invention will appear from the dependent claims reciting preferred embodiments of the invention.

In the course of the development of the present invention, it has surprisingly been found that the clamping strap can be reliably secured to the pipe by welding without previously punching holes in the sealing ring, i.e. through the sealing ring material. This shortens the total cycle time for fastening the sealing ring on the pipe. Practical tests have shown that the cycle time is almost reduced by half as compared with the prior-art technique described above (from 6–7 s to 3–4 s). The punch, stretcher finger and clamping-strap cutter of the known technique can be dispensed with, thereby increasing the operational availability of the device according to the invention by reducing the number of error possibilities.

The costs for scheduled maintenance are brought down by the reduced number of mechanical parts. For example, the rubber punch of the prior art wears relatively quickly and thus requires exchanging at fairly short intervals.

The invention entails considerable cost savings and consequently a significant increase in efficiency without adversely affecting the resistance of the fastening assembly or impairing the reliability.

BRIEF DESCRIPTION OF THE DRAWINGS

Currently preferred embodiments of the invention will be described by way of example hereinafter with reference to the accompanying drawings.

DESCRIPTION OF THE PREFERRED EMBODIMENTS

Figure 2:
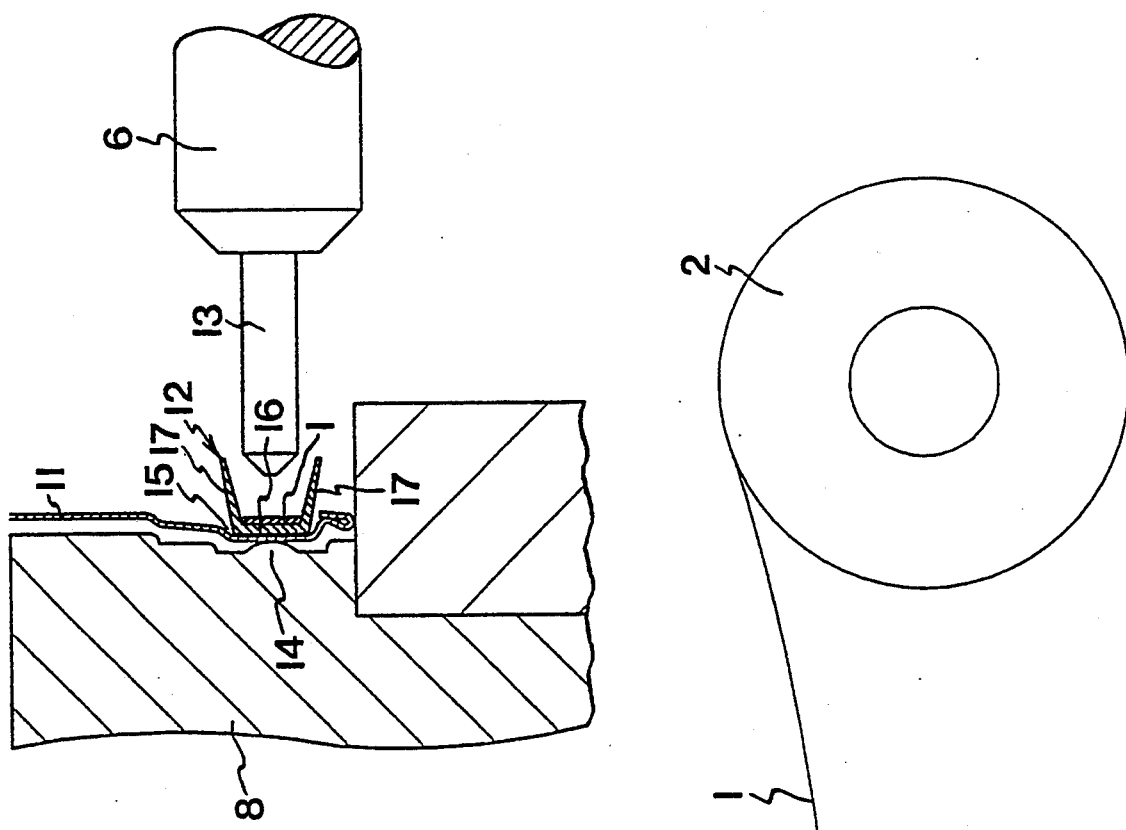
FIG. 2 is a vertical partial section on a larger scale taken along the line II—II in FIG. 1 at the location of the spot-welding operation.
Figure 1:
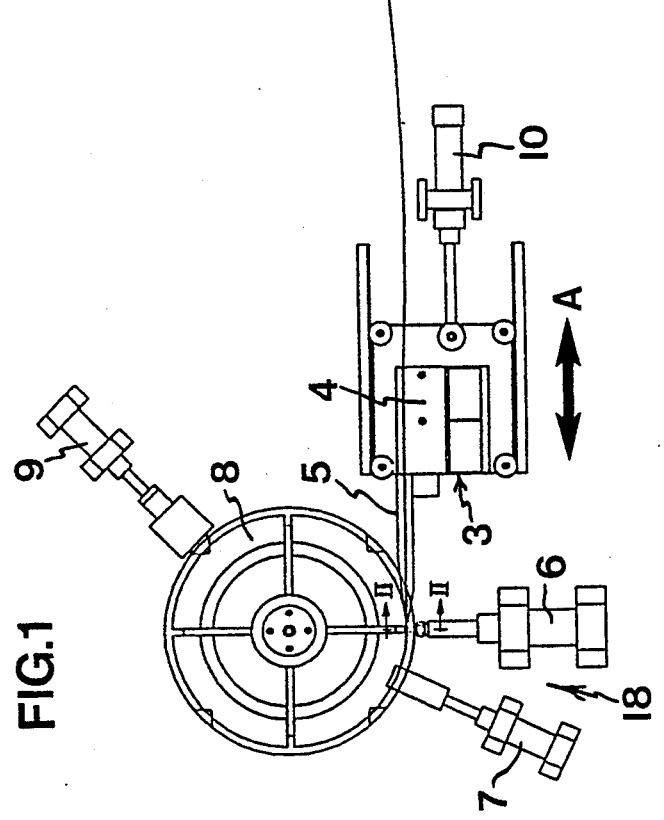
FIG. 1 schematically shows from above a device for carrying out the method according to the invention.

FIGS. 1–2 show a device for carrying out the method of the invention, in which an elastic seal or sealing ring 12 is mounted on the outside of a pipe 11, for example a ventilation duct component. The pipe 11 is intended in known manner to be partially inserted in another pipe (not shown). In the illustrated embodiment, the seal 12 is a double-lip seal of U-shaped cross-section of the type described in U.S. Pat. No. 4,050,703, mentioned in the introductory part. The seal 12, preferably made of an elastic rubber material, thus has a web or base portion 16 to be applied against the outer side of the pipe 11 round its circumference, and two sealing lips 17 projecting from the base portion 16 and extending substantially radially outwards from the pipe 11. Preferably, the pipe 11 has in known manner a circumferential groove 15 which has a smaller diameter than the rest of the pipe 11 and in which the seal 12 is placed. The seal 12 is retained and clamped in place by means of a clamping strap 1, as will be described in more detail hereinafter.

Moreover, the device according to the invention has a rotatable, substantially circular pipe holder 8 which is radially expandable and on which the pipe 11 is placed for mounting the seal 12. A spot-welding unit 18 having a negative welding pole 6 and a positive welding pole 7 is disposed adjacent the pipe holder 8 like an index locking unit 9 controlling the rotation of the pipe holder 8. The device also comprises a feeding unit 3 for feeding and guiding the clamping strap 1 from a supply reel 2 to the pipe 11. The strap 1 is conducted from the reel 2 past a friction-exerting mechanism 4 included in the feeding unit 3 and intended to grip and exert a braking action on the strap 1, and out through a clamping-strap channel 5 up to the pipe 11 placed on the holder 8. The feeding unit 3 also comprises a piston and cylinder assembly 10 for moving the feeding unit 3 towards or away from the pipe holder 8.

The seal 12 according to the invention is fastened in the following manner, the functions described being executed on command by a control device (not shown).

The seal 12 is first forced on to the pipe 11 and placed in the groove 15, whereupon the pipe 11 is placed on the pipe holder 8. The pipe 11 is retained in place on the holder 8 by radial expansion thereof. With the pipe 11 stationary, the clamping strap 1 is advanced by the feeding unit 3, placed between the seal 12 and the electrode 13 of one welding pole 6 and positioned between the lips 17 of the seal 12 with its end located at or adjacent the welding electrode 13.

By means of the welding electrode 13, the clamping strap 1 and the pipe 11, with the seal 12 disposed therebetween, are then pressed against a ridge-shaped abutment 14 projecting from the pipe holder 8, and a welding spot is produced when switching on electric current. The pipe 11 is thereafter rotated by the pipe holder 8 about 450°, so that the clamping strap 1 entirely encloses the pipe 11 with an overlapping portion corresponding to about ¼ of the circumference of the pipe 11. The strap 1 is maintained tensioned by the inertia of the reel 2 during the first four quarter turns (360°), whereupon the strap-braking device of the friction-exerting mechanism 4 is activated during the fifth quarter turn so as to firmly tighten the clamping strap 1 with respect to the pipe 11 to ensure solid anchorage of the seal 12. The strap 1 is then fixed in this overlapping portion in the same manner as described above.

When making or immediately after making the last welding spot, the clamping strap 1 is snapped off at or adjacent this last welding spot when the strap material is hot and hence weakened. This is accomplished by a rearward movement of the feeding unit 3 (indicated by the arrow A in FIG. 1) after the strap 1 has been gripped by the strap-gripping means of the friction-exerting mechanism 4. The movement of the feeding unit 3 is brought about by the piston and cylinder assembly 10. After snapping off the clamping strip, the fastening of the seal 12 is completed, and the pipe 11 is removed after the pipe holder 8 has been radially contracted. This cycle can then be repeated.

Figure 3:
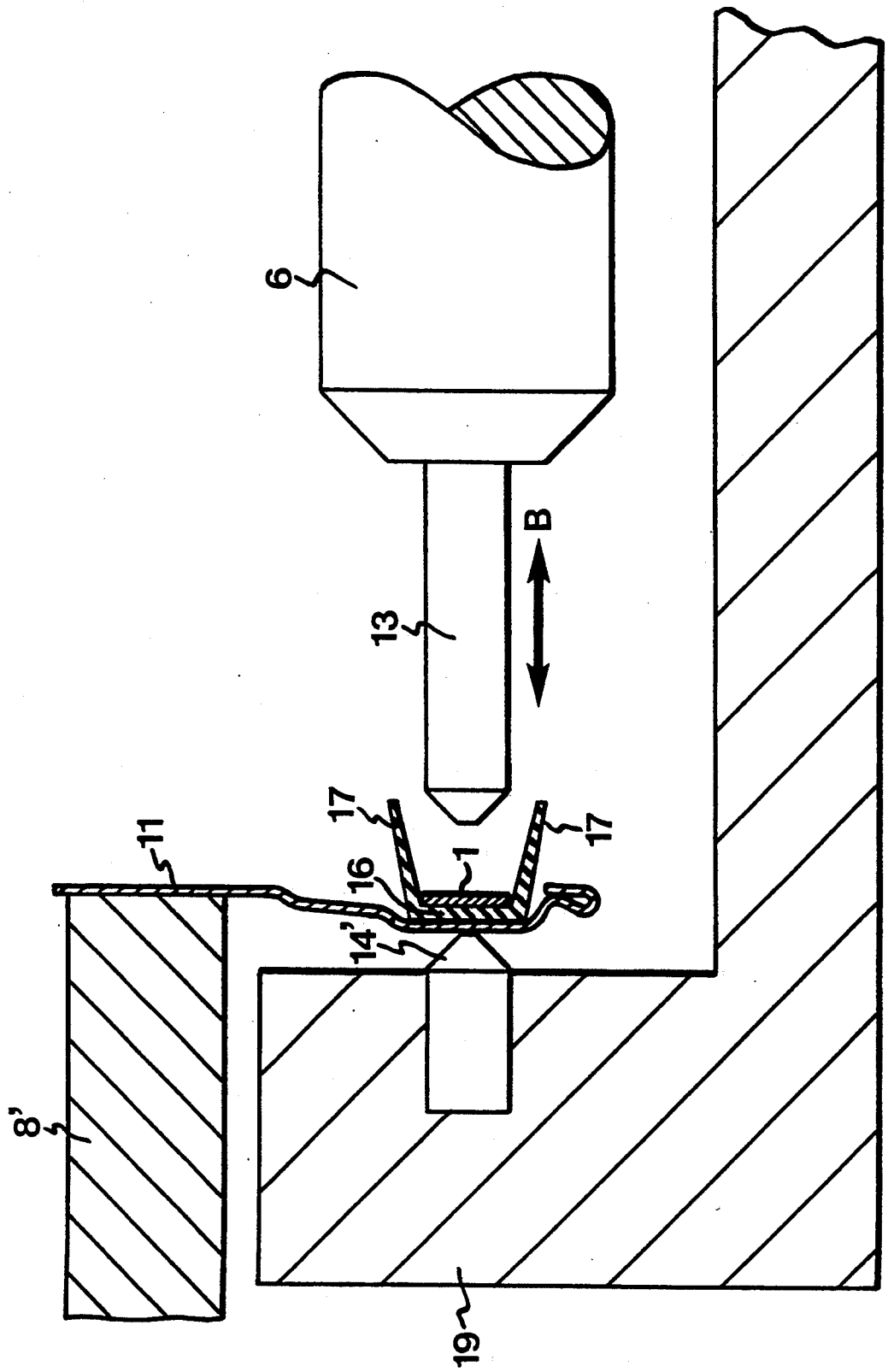
FIG. 3 is a view, similar to FIG. 2, of the spot-welding operation according to an alternative arrangement.

FIG. 3 shows a variant in which the pipe 11 is placed on a slightly modified pipe holder 8', which is however expandable like the pipe holder 8 described above. In this case, the required abutment function is provided by a special means 19 which is disposed within the pipe 11 and has an abutting ridge 14' corresponding to the ridge 14 described above. Advantageously, the abutment means 19 is connected to the spot-welding unit 18, also including the welding electrode 13.

The welding electrode 13 is movable back and forth as indicated by the double arrow B. The abutment means 19 is movable in a similar way. During spot welding, the tip portion of the welding electrode 13 is thus pressed towards the abutment ridge 14' according to the operating principle of a pair of pincers. This provides for an efficient force of application clamping the strap 1 and the base portion 16 of the seal 12 between the ridge 14' and the tip of the electrode 13.

It should be pointed out that another relative movement between the welding electrode 13 and the abutment means 19 may be employed. Alternatively, one of these parts may be stationary.

By this technical solution, it thus becomes possible to halve the cycle time as compared with prior-art techniques and at the same time increase the total operational availability of the device. A special advantage gained by separating the clamping strap in connection with the last welding spot is that the clamping strap, as opposed to conventional technique, need not be guided out through the clamping-strap channel. Since the strap according to the prior art is cut off at a distance from the pipe within the feeding unit, a special mechanism is required for guiding the strap, since this tends to curl up as a result of being wound in a reel. The invention thus obviates the need for such a guide mechanism.

Since the clamping strap of the invention is not separated from the supply until the last welding spot is made, another essential advantage is gained, namely that the strap is maintained under tension until it has been definitely fastened by spot welding. According to prior-art solutions, the strap was previously cut off, thus causing strap-tensioning problems.

A device of conventional type further requires readjustment of the strap punch every time the pipe dimension is changed, since the clamping strap is to be cut off at a distance from the pipe corresponding to about ¼ of the circumference of the pipe. The adjustment is then carried out by means of a piston and cylinder assembly placed on the feeding unit. The device according to the invention however requires no such arrangement thanks to the clamping strap being separated adjacent the welding site.

To conclude, it should be pointed out that the invention is by no means restricted to the steps and components described in the foregoing, but several modifications are conceivable within the scope of the inventive concept appearing from the appended claims. It should be noted in particular that the automatic method of fastening the sealing ring according to the embodiment described above may equally well be carried out manually. The seal itself may also be of another design, have L-shaped cross-section, one L-flange forming the base portion and the other L-flange forming a radial sealing lip. It is of course understood that the seal can have more than two lips, in which case clamping straps are suitably tightened about all the base portions between the lips for reliable anchorage of the seal.

What we claim and desire to secure by Letters Patent is:

1. A method for fastening an elastic sealing ring on the outside of a tubular body or pipe to be partially inserted in another pipe with a seal therebetween, the sealing ring having in cross-section at least one base portion and at least one sealing lip radially projecting from the base portion, comprising the steps of applying the sealing ring on the pipe while pressing the base portion against the circumferential surface of the pipe; feeding a clamping strap from a supply, applying the strap round the outer face of the base portion of the sealing ring under tension, and securing the strap to the pipe by spot welding in at least two welding spots; carrying out the spot welding with the material of the sealing ring disposed between the clamping strap and the pipe at the location of the welding spots; and separating the clamping strap tightened on and welded to the pipe from the supply when making the last welding spot, at a point adjacent thereto.

2. A method as claimed in claim 1, wherein the clamping strap is separated by a snap-off movement of the strap directed contrary to the feed direction of the strap.

3. A method as claimed in claim 1, wherein the clamping strap is conducted through and fed to the pipe by means of a feeding unit.

4. A method as claimed in claim 1, wherein the clamping strap is tightened against the base portion of the sealing ring and hence towards the pipe by strap-braking means included in a friction-exerting mechanism.

5. A method as claimed in claim 4, wherein the strap, prior to separation, is locked by strap-gripping means included in the friction-exerting mechanism and, to bring about said separation, is moved in a direction contrary to its feed direction.

6. A method as claimed in claim 1, wherein the clamping strap is applied on the outer side of the base portion of the sealing ring by rotating the pipe.

7. A device for fastening an elastic sealing ring on the outer side of a tubular body or pipe to be partially inserted in another pipe with a seal therebetween, the sealing ring having in cross-section at least one base portion to be applied against the outer side of the pipe, and at least one sealing lip projecting from the base portion and extending substantially radially outwards, the device comprising a supply of a clamping strap; a movable means for feeding the clamping strap from the supply to the pipe; a means for placing, under tension, the clamping strap on the base portion of the sealing ring; a unit for spot-welding the clamping strap to the pipe; means for separating the clamping strap from the supply, said device further comprising a friction-exerting mechanism for gripping and exerting a braking action on the clamping strap; and an abutment means which is to be placed within the pipe and against which a welding electrode associated with the spot-welding unit is adapted to be pressed with the base portion of the sealing ring and the clamping strap located therebetween.

8. A device as claimed in claim 7, wherein the friction-exerting mechanism is part of the feeding unit.

* * * * *